(12) United States Patent
Boyer et al.

(10) Patent No.: US 12,054,153 B2
(45) Date of Patent: Aug. 6, 2024

(54) METHOD OF REQUESTING A STOP IN A SAFE ZONE BY SIMULATING A MOTOR VEHICLE MALFUNCTION

(71) Applicant: VITESCO TECHNOLOGIES GMBH, Hannover (DE)

(72) Inventors: Jean-Luc Boyer, Toulouse (FR); Thibaut Lahore, Toulouse (FR)

(73) Assignee: VITESCO TECHNOLOGIES GMBH, Hannover (DE)

( * ) Notice: Subject to any disclaimer, the term of this patent is extended or adjusted under 35 U.S.C. 154(b) by 636 days.

(21) Appl. No.: 17/276,911

(22) PCT Filed: Sep. 18, 2019

(86) PCT No.: PCT/EP2019/075087
§ 371 (c)(1),
(2) Date: Mar. 17, 2021

(87) PCT Pub. No.: WO2020/058375
PCT Pub. Date: Mar. 26, 2020

(65) Prior Publication Data
US 2021/0370939 A1    Dec. 2, 2021

(30) Foreign Application Priority Data

Sep. 18, 2018 (FR) ...................................... 1858387

(51) Int. Cl.
*B60W 30/18* (2012.01)
*B60K 28/10* (2006.01)
(Continued)

(52) U.S. Cl.
CPC ........... *B60W 30/181* (2013.01); *B60K 28/10* (2013.01); *B60W 10/06* (2013.01); *B60W 10/08* (2013.01);
(Continued)

(58) Field of Classification Search
CPC .... B60W 30/181; B60W 10/06; B60W 10/08; B60W 50/02; B60W 50/12; B60W 50/14;
(Continued)

(56) References Cited

U.S. PATENT DOCUMENTS

| 9,014,960 B2 | 4/2015 | Bresnahan et al. |
| 2004/0010361 A1* | 1/2004 | Gierer ..................... F16H 61/12 701/62 |

(Continued)

FOREIGN PATENT DOCUMENTS

| FR | 2 928 328 | 9/2009 |
| FR | 2 928 328 A1 | 9/2009 |

OTHER PUBLICATIONS

International Search Report for PCT/EP2019/075087 dated Feb. 28, 2020, 5 pages.

(Continued)

*Primary Examiner* — Anne Marie Antonucci
*Assistant Examiner* — Jodi Marie Jones
(74) *Attorney, Agent, or Firm* — NIXON & VANDERHYE

(57) ABSTRACT

Disclosed is a vehicle with an engine control unit including a unit for detecting the imminence of a breakdown with the engine or with an element associated with the engine, and a vehicle control unit including a unit for geo-locating the vehicle and the closest structure for repairing an imminent breakdown, a unit for formulating a route that the vehicle needs to follow in order to reach the structure and for geo-locating at least one safe stopping place that is en-route, the two units including a unit for receiving and transmitting information between them, the vehicle control unit sending the engine control unit a request for temporary malfunctioning of the vehicle just before the vehicle passes the at least one safe stopping place or the structure.

20 Claims, 2 Drawing Sheets

(51) Int. Cl.
*B60W 10/06* (2006.01)
*B60W 10/08* (2006.01)
*B60W 50/02* (2012.01)
*B60W 50/12* (2012.01)
*B60W 50/14* (2020.01)

(52) U.S. Cl.
CPC ............ *B60W 50/02* (2013.01); *B60W 50/12* (2013.01); *B60W 50/14* (2013.01); *B60W 2050/143* (2013.01); *B60W 2050/146* (2013.01); *B60W 2552/00* (2020.02)

(58) Field of Classification Search
CPC ..... B60W 2050/143; B60W 2050/146; B60W 2552/00; B60K 28/10; G01C 21/3407
USPC ..... 701/23, 93, 110, 26, 400, 409, 107, 437, 701/70, 1
See application file for complete search history.

(56) References Cited

U.S. PATENT DOCUMENTS

2011/0238292 A1* 9/2011 Bresnahan ......... G01C 21/3407
 701/533
2012/0078509 A1 3/2012 Choi
2013/0179006 A1 7/2013 Nordbruch et al.

OTHER PUBLICATIONS

Written Opinion of the ISA for PCT/EP2019/075087 dated Feb. 28, 2020, 6 pages.
Office Action, issued in Chinese Patent Application No. 201980060975.4 dated Jan. 15, 2024.

* cited by examiner

METHOD OF REQUESTING A STOP IN A SAFE ZONE BY SIMULATING A MOTOR VEHICLE MALFUNCTION

CROSS-REFERENCE TO RELATED APPLICATIONS

This application is the U.S. national phase of International Application No. PCT/EP2019/075087 filed Sep. 18, 2019 which designated the U.S. and claims priority to FR 1858387 filed Sep. 18, 2018, the entire contents of each of which are hereby incorporated by reference.

BACKGROUND OF THE INVENTION

Field of the Invention

The present invention relates to a method of requesting that a motor vehicle stop in a safety zone through a motor vehicle malfunction temporarily simulating a breakdown, this request being made by an electronic control unit in the vehicle when an imminent breakdown of the vehicle has been detected in order to encourage the driver to stop in a safe zone that does not present a danger for a stoppage that may be long-lasting, for example in a parking area, a motorway rest-break area or even for preference a structure whereat the breakdown in question can be repaired.

Description of the Related Art

The method for requesting a stop comprises a step of detecting the imminence of at least one breakdown, a step of geo-locating the closest structure for repairing said at least one breakdown, a step of indicating to the driver the route that needs to be followed in order to reach the structure after having geo-located both a position of the motor vehicle and at least one safe stopping place on the route of the motor vehicle toward the structure.

At the present time, on detection of a serious fault that is going to immobilize the vehicle, for example a low fuel level below a minimum reserve, a risk of engine failure, for example a defective fuel injector which may, in the fairly long term, lead to a failure of the injection system, in which case the motor vehicle will break down, the driver is forewarned of the imminence of a respective breakdown by the activation of an indicator present on the vehicle instrument panel which indicates the type of breakdown and its imminence, where this can be determined, which is not always the case as the imminence of the breakdown may be unpredictable.

For example, and nonlimitingly, for an imminent out-of-fuel breakdown, an indicator that indicates that the tank is almost empty is illuminated, and this, where appropriate, is accompanied by an estimate of the distance that can still be covered. In another breakdown scenario affecting the engine, the vehicle is automatically placed in a downgraded mode, this downgraded mode being better known by its English name of "limp-home" mode so that the vehicle is put in a position of being able to complete its journey.

In parallel with this, a maintenance indicator lights up on the instrument panel indicating to the driver the necessity of getting a repair done at a garage.

Document U.S. Pat. No. 9,014,960 B2 describes a navigation system management method implemented by a computer and involving obtaining an emergency stop request for a vehicle currently driving on a road network, determining a current position of the vehicle, establishing an emergency profile that provides the duration of a time until the emergency stop, determining a maximum distance that can be covered during the established time until the emergency stop, and identifying an emergency stopping place that falls within the maximum distance.

That document therefore proposes correlating the detection of an imminent breakdown with geolocation information, this being done mainly using a global positioning system better known by its English abbreviation GPS carried on board the vehicle, so as to propose a safe stopping place or parking place for the vehicle.

However, according to the teaching described in that document, there is a high risk that the driver will choose the solution of reaching their destination at all costs, and then sorting things out.

Therefore, if the driver continues to drive, given that the location at which the breakdown occurs is often unpredictable except in an out-of-fuel breakdown where the on-board computer indicates how many kilometers can still be covered at a previously recorded average driving speed, the vehicle will come to a standstill wherever, and may be the cause of an accident, become a significant obstacle to traffic, and require the intervention of officers of the law.

Therefore, the technical problem that arises, with respect to document U.S. Pat. No. 9,014,960 B2, is that of ensuring that, if an imminent breakdown of the motor vehicle is detected, a control unit carried on board the vehicle and having detected the imminent breakdown, can send the driver information and a persuasive influence that encourage them to stop the motor vehicle either at a breakdown repair structure, when one can be reached without risk to the motor vehicle, or at a place that is en-route to the repair structure, offering a stopping place that is safe as long as the vehicle is still operating.

SUMMARY OF THE INVENTION

To this end, the present invention relates to a method for requesting the stopping of a motor vehicle, which request is formulated and issued automatically by the motor vehicle itself, the method comprising a step of detecting at least one imminent breakdown, a step of geo-locating the closest structure for repairing said at least one breakdown, a step of indicating to the driver the route to be followed in order to reach the structure after having geo-located a position of the motor vehicle and at least one safe stopping place that is on the route of the motor vehicle toward the structure, notable in that the motor vehicle is automatically made to temporarily malfunction just before it passes said at least one safe stopping place or passes the structure, so as to encourage the driver to stop at said at least one safe stopping place or at the structure.

The repair structure may be a garage for an engine breakdown or a recharging point in the case of a flat battery or else a fuel filling station for an out-of-fuel breakdown. There may be different types of breakdown with breakdowns that can be classified as breakdowns with unforeseeable or unpredictable imminence, such as engine breakdowns, or breakdowns the imminence of which is predictable, such as out-of-fuel breakdowns.

For breakdowns the imminence of which is unforeseeable and which carry a high level of severity, there is a risk associated with continuing the journey to the repair structure at all costs, whereas in the case of breakdowns with a foreseeable imminence, a control unit of the vehicle may determine in advance whether or not the structure can be reached and at what speed. The two types of breakdown may thus be handled in different ways.

A safe stopping place is a place at which the driver or the vehicle is not exposed to accident, unlike, for example, being forced to stop the vehicle unpredictably in an emergency-stopping lane or hard shoulder. This safe stop may for example be at a motorway rest-break area or in a parking place separated from, or not directly adjacent to, the carriageway.

The method according to the invention allows an engine malfunctioning action to be performed shortly before the motor vehicle in imminent danger of breakdown passes a safe stopping place, so as to very strongly encourage the driver to stop in a safe zone while it is still possible to do so.

Performing a temporary engine-malfunctioning action in order to slow the vehicle down or even temporarily stop the vehicle before a stopping place selected for its safeness makes it possible to avoid the risks of accident while getting the vehicle as close as possible to a service station or a repair center, these two entities being referred to collectively as structures.

This then avoids a motor vehicle experiencing a breakdown in a place that is dangerous to the driver, to the passengers, and also to other road users.

Every attempt is therefore made to convince the driver to stop for repairs as soon as possible in a safe zone as close as possible to a replenishment or maintenance outlet.

The prior art proposed only solutions for driving in a downgraded mode in order to protect the vehicle and, mostly, its engine. This downgraded mode may have consisted, for example, in limiting the performance of the motor vehicle so as to allow the vehicle to return, in a manner that was safe for the vehicle and its occupants, as far as a repair outlet, and in supplying the driver with information regarding an imminent breakdown by means of an indicator lamp on the instrument panel. It did not strongly encourage the driver to stop driving at a safe place, which is what the method according to the present invention proposes to do, with a downgraded mode or without a downgraded mode.

Thus, the closest prior art illustrated by document U.S. Pat. No. 9,014,960 B2 correlated a detection of an imminent breakdown with geolocation information in order to propose a place at which to park the vehicle. There was no suggestion or urging of the driver to encourage them to stop at an indicated place, given that their motor vehicle was giving them the impression of operating normally.

The temporary malfunction that the present invention proposes, which is not a breakdown but a temporarily simulation of a breakdown, allows the driver to be made fully aware that a breakdown may occur at any moment and that they need to seek refuge for themself and for their motor vehicle in order not to break down on the carriageway itself. When a safe parking zone is going to be reached, an action on the engine controls that suddenly diminishes the operation of the engine cannot fail to encourage the driver in the strongest possible terms to stop in a safe zone while it is still possible to do so.

The present invention is therefore novel in relation to document U.S. Pat. No. 9,014,960 B2 and is not obvious from that document because that document does not contain any suggestion of acting on the engine controls in order to encourage a driver to stop, or any encouragement to correlate the location of a safe stopping place with an action on the operation of the motor vehicle aimed at encouraging the driver to stop at the safe place located.

Advantageously, a step of evaluating whether the imminence of the breakdown is not unpredictable and can be quantified in terms of a time duration and/or a number of kilometers that can still be covered until the breakdown occurs is performed, and, when the time and/or the number of kilometers before the breakdown occurs may allow the vehicle to reach the structure without stopping, no temporarily malfunctioning is performed just before the vehicle passes said at least one safe stopping place.

A breakdown of non-unpredictable imminence, such as an out-of-fuel breakdown or a flat battery breakdown, is easier to manage because the number of kilometers still to be covered before the breakdown occurs is known, and driving can be regulated accordingly. There is no risk of breaking down before the calculated number of kilometers have been covered.

In the case of a battery, there are tables extrapolating the decrease in battery voltage over time, and the time at which a minimum voltage will be reached can be known relatively precisely. This may also be the case of a wheel which is gradually deflating as it loses air. By contrast, most engine breakdowns are unpredictable and their imminence cannot be foreseen as easily.

Advantageously, in the category of breakdowns the imminence of which is unpredictable and unquantifiable, a level of severity is determined for each breakdown, a temporary malfunction associated with a breakdown having a higher level of severity than another breakdown having a longer duration and/or a higher amplitude of malfunctioning than the other breakdown.

An unpredictable breakdown therefore requires a preventive measure which is to stop at the first safe stopping place. However, the level of severity of the breakdown may be taken into consideration when choosing between stopping at the first place or stopping later. The amplitude and the duration of the temporary malfunction that are artificially imposed by the engine control allow the driver to gain an awareness of the severity of the breakdown and to take measures accordingly.

Advantageously, just before the vehicle passes the structure and when, on the one hand, the level of severity of the breakdown is at a maximum for a breakdown the imminence of which is unpredictable and unquantifiable or, on the other hand, no other structure has been geo-located as being reachable within the time and/or the number of kilometers that can be covered before the breakdown occurs in the case of a breakdown imminence that is not unpredictable and can be quantified in terms of time and/or in terms of kilometers that can be covered, the temporary malfunctioning of the motor vehicle just before the motor vehicle passes the structure is a collection of temporary cuttings-out of the engine of the motor vehicle.

This is done in order to allow the driver to gain an awareness that the danger of breakdown is imminent with extreme risk and that it is almost compulsory for him to stop in the structure. Such malfunctioning with intermittent stopping of the engine may make them aware of the severity of the situation.

Advantageously, when several safe stopping places have been geo-located on the route of the motor vehicle toward the structure, the temporary malfunctionings of the motor vehicle just before the motor vehicle passes one of the safe stopping places will increase in terms of the duration and/or in terms of the amplitude of the malfunction affecting the vehicle the further the motor vehicle progresses along its route.

This is because, statistically, the more the vehicle runs, the more the imminence of the breakdown increases, which is why the driver needs to be made increasingly aware of the need to stop in a safe place.

Advantageously, the temporarily malfunctioning or malfunctionings of the motor vehicle are an intermittent cutting-out of the engine of the vehicle, followed by normal engine operation, complete cutting-off or temporary reduction in the injection of fuel into a combustion engine for a motor vehicle being powered by a combustion engine, a cutting-off of a demand for torque from an electric motor for a motor vehicle being powered electrically, so that the motor vehicle advances only by coasting in the engine-powered mode or in the electrically-powered mode respectively, a limiting of engine speed by an engine control unit or by limiting the extent to which a throttle pedal can be depressed, preventing any re-acceleration.

Advantageously, the temporary malfunctionings of the motor vehicle are respectively linked to a type of breakdown, a stopping of the engine or a complete cutting-off of the injection being linked with an imminent out-of-fuel breakdown, a limiting of the engine speed or a reduction in injection corresponding to an imminent breakdown caused by failure of the injection system, the cutting-off of the demand for torque from an electric motor corresponding to an imminent breakdown with a traction battery of an electric motor vehicle.

This, in addition to a displaying of the type of imminent breakdown on the instrument panel of the motor vehicle, contributes to informing the driver of the type of breakdown, unpredictable or otherwise, of its level of severity, which may further encourage them to stop at the next safe place.

Advantageously, the temporary malfunctioning of the motor vehicle just before the motor vehicle passes said at least one safe stopping place or the structure occurs an estimated duration of more than ten seconds beforehand, depending on the current speed so that the motor vehicle reaches said at least one safe stopping place or the structure.

This is because the onset of the temporary malfunction needs to leave the driver enough time to perform the necessary maneuver in order to stop in the safe place. This duration can be calculated as a function of the speed of the vehicle.

Advantageously, the method comprises a step of visually or audibly warning the driver that an imminent breakdown has been detected, including a mention of the type of imminent breakdown detected. This supplements and if necessary explains what breakdown is imminent.

The invention relates to a motor vehicle comprising an engine control unit and a vehicle control unit, the vehicle implementing such a method for requesting a stop, which request is formulated and emitted automatically by the vehicle, notable in that the engine control unit comprises means for detecting the imminence of a breakdown with the engine or with an element associated with the engine, and the vehicle control unit comprises means for detecting the imminence of a breakdown other than a breakdown with the engine or with an element associated with the engine, as well as means for geo-locating both the vehicle and the closest structure for repairing an imminent breakdown, means for formulating a route that the vehicle needs to follow in order to reach the structure and for locating at least one safe stopping place that is en-route, the two units comprising means for receiving and transmitting information between them, the engine control unit informing the vehicle control unit of an imminent breakdown with the engine or with an element associated with the engine, and the vehicle control unit sending the engine control unit a request for temporary malfunctioning of the motor vehicle just before the motor vehicle passes said at least one safe stopping place or the structure when the imminence of a breakdown has been detected by one of the two units, the vehicle control unit comprising means for terminating the implementation of the method when the vehicle has been stopped at said at least one safe stopping place or at the structure and sending the engine control unit a request to end the temporary malfunctioning.

It is essentially the vehicle control unit which decides to implement the method following detection of an imminent breakdown performed by this vehicle control unit or by the engine control unit, the latter essentially being concerned with breakdowns affecting the engine or an element associated with the engine. The vehicle control unit also handles the locating of the vehicle, of at least one structure for handling the breakdown and of safe stopping places.

By contrast, the implementation of the malfunctionings is performed by the engine control unit at the request of the motor vehicle control unit, these malfunctionings essentially concerning engine operating parameters.

BRIEF DESCRIPTION OF THE DRAWINGS

Other features, aims and advantages of the present invention will become apparent on reading the following detailed description and on examining the appended drawings given by way of non-limiting example, and in which.

DESCRIPTION OF THE PREFERRED EMBODIMENTS

Figure 1:
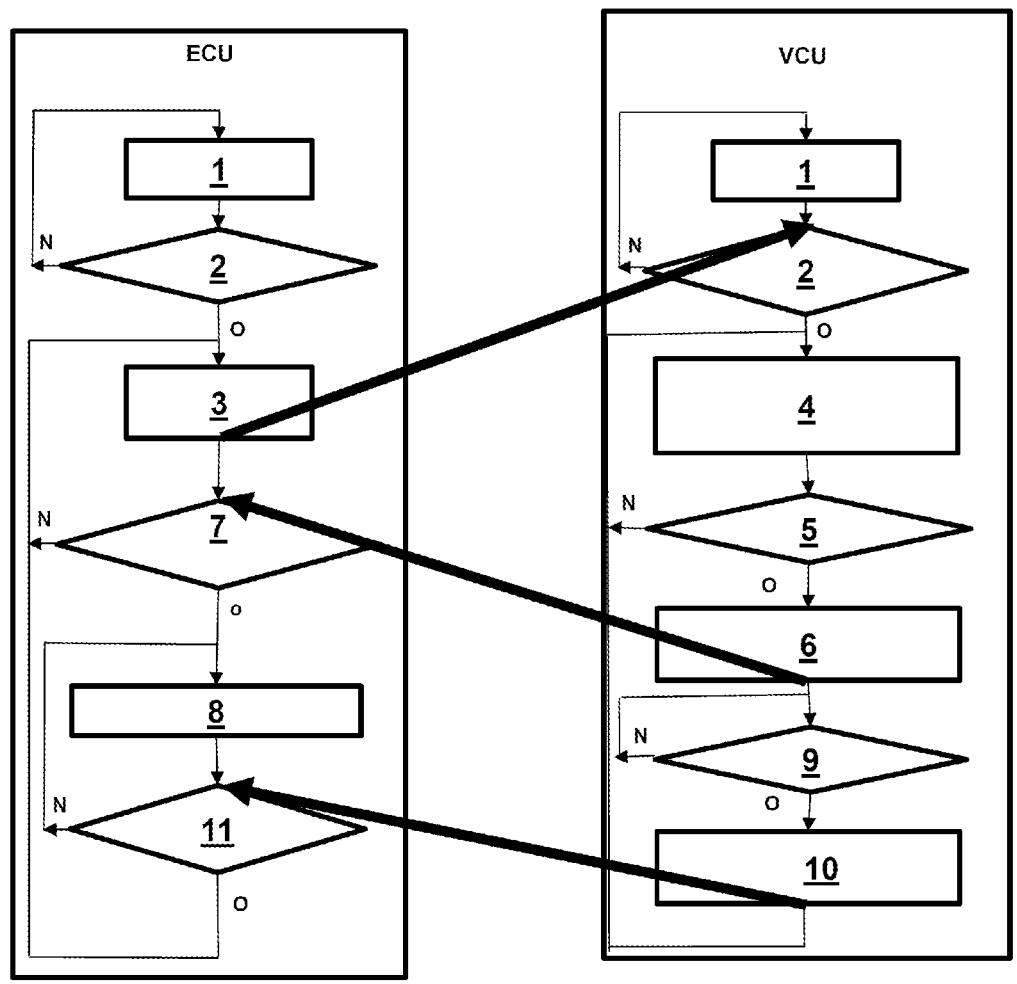
FIG. 1 is a flowchart of one preferred embodiment of the method for requesting a stopping of a motor vehicle with breakdown imminent, which request is formulated and issued automatically by the motor vehicle according to the present invention.

With reference to FIG. 1, the present invention relates to a method for requesting a stopping of a motor vehicle, which request is formulated and is transmitted automatically by the motor vehicle itself, advantageously via a motor vehicle control unit VCU communicating with an engine control unit ECU to send it requests for malfunctionings of the engine, the engine control unit ECU being tasked with implementing these malfunctionings of the engine.

The method comprises a step of detecting the imminence of at least one breakdown. This breakdown may have been detected by the engine control unit ECU when it is a breakdown affecting the engine or an element associated with the engine, or by the motor vehicle control unit VCU when the breakdown does not concern the engine.

The motor vehicle control unit VCU is tasked with performing a step of geo-locating the closest structure for repairing said at least one breakdown. The structure will for example be a garage for various breakdowns or even a fuel filling station in the case of an out-of-fuel breakdown. This is performed using a global positioning system also known by its English abbreviation GPS, this system being carried on board the motor vehicle.

Also performed by the motor vehicle control unit VCU, the method comprises a step of indicating to the driver what route to follow in order to reach the structure after the position of the motor vehicle has been geo-located. The method also performs a step of locating at least one safe stopping place that is on the route of the motor vehicle toward the structure, advantageously several safe stopping places distributed along the route that the vehicle has to follow toward the structure.

According to the invention, a temporary malfunctioning of the motor vehicle is brought about automatically just before the motor vehicle passes said at least one safe stopping place or the structure, so as to encourage the driver to stop at said at least one safe stopping place or at the structure.

The temporary malfunctioning may adopt several forms, the important thing being that it causes the driver of the vehicle to gain an awareness that their vehicle may break down even if the temporary malfunctioning has nothing to do with the imminent breakdown.

This takes place before the place or the structure is passed so as to give the driver the time needed to undertake the maneuver toward the safe stopping place or the structure.

The temporary malfunctioning of the motor vehicle just before the motor vehicle passes said at least one safe stopping place or the structure may for example occur an estimated duration of more than ten seconds before the motor vehicle will reach said at least one safe stopping place or the structure, depending on the current speed, which allows the driver to perform the corresponding maneuver to enter the safe stopping place from a carriageway with fast-moving traffic such as a motorway.

An evaluation step may be performed if the imminence of the breakdown is not unpredictable and is quantifiable in terms of the time duration and/or in terms of the number of kilometers that can be covered before the breakdown occurs. When the time duration and/or the number of kilometers before the breakdown occurs may allow the vehicle to reach the structure without stopping, no temporary malfunctioning occurs just before the vehicle passes said at least one safe stopping place.

This applies, for example, to an out-of-fuel breakdown. By estimating, using the engine control unit ECU, the forthcoming fuel consumption, advantageously on the basis of an averaged recent fuel consumption, it may be possible to determine exactly how many kilometers can still be covered, especially if this number of kilometers to be covered can be revised according to the new fuel consumption achieved.

There is a special case that may arise. If the vehicle is able to reach its final destination, for example if the imminence of a breakdown is quantifiable, a motor vehicle control unit VCU may take the decision not to request the stopping of the vehicle at a safe stopping place and therefore not to bring about one or more temporary malfunctionings.

In the category of breakdowns the imminence of which is unpredictable and unquantifiable, in order not to stop a vehicle needlessly at a safe stopping place when the minor severity of the breakdown would have allowed the vehicle to drive as far as the structure, a level of severity is determined for each breakdown.

A temporary malfunction associated with a breakdown having a higher level of severity than another breakdown may have a longer duration and/or a higher amplitude of malfunctioning than the other breakdown. Thus, the driver will be more inclined to stop at a safe stopping place if the malfunctionings are more pronounced, being indicative of the imminence of a serious breakdown.

In order to strongly encourage a driver to stop for an unquantifiable breakdown with a high level of severity, or for a quantifiable breakdown when only a forthcoming structure will be able to resolve the breakdown, it is possible that the temporary malfunctioning of the motor vehicle just before the motor vehicle passes the structure may be a temporary stopping of the engine of the motor vehicle.

This applies when there are no other structures that can be reached on the route and demonstrates to the driver the danger in continuing to run without having found a solution to the imminent breakdown.

This temporary stopping may occur just before the vehicle passes the structure. In a first scenario, this can therefore be done when the level of severity of the breakdown is a maximum for a breakdown the imminence of which is unpredictable and unquantifiable. In another scenario, this may also be done when no other structure has been geo-located as being reachable within the time duration and/or the number of kilometers that can still be covered before the breakdown occurs for a breakdown the imminence of which is not unpredictable and can be quantified in terms of time duration and/or number of kilometers.

When several safe stopping places have been geo-located on the route of the motor vehicle toward the structure, the temporary malfunctionings of the motor vehicle just before the motor vehicle passes one of the safe stopping places increase in terms of the duration and/or in terms of the amplitude of the malfunction affecting the vehicle the further the motor vehicle progresses along its route.

This is because the longer the motor vehicle continues to run, the more this vehicle is liable to suffer an imminent breakdown, hence the advantage of reminding the driver of the vehicle that a breakdown may occur at any moment and that it would be better to stop the vehicle at a safe stopping place rather than breaking down on the carriageway.

The temporary malfunctioning or malfunctionings of the motor vehicle may be an intermittent cutting-out of the engine of the vehicle, followed by normal engine operation. This may act as a temporary malfunction that offers a high level of encouragement to the driver to stop.

What may also be implemented is a complete cutting-off or temporary reduction in the injection of fuel into a combustion engine for a motor vehicle being powered by a combustion engine, for example, and nonlimitingly, a 3-second cut-off for a 10-second injection, repeated several times, or not repeated.

By analogy with the preceding measure, for an electric motor, what may also be implemented is a cutting-off of a demand for torque from an electric motor for a motor vehicle being powered electrically, for example, and nonlimitingly, a 3-second cut-off every 10 seconds, repeated several times, or not repeated.

This may allow the motor vehicle to advance only, or by intervals, by coasting in the engine-powered mode or in the electrically-powered mode respectively.

What may also be implemented is a limiting of engine speed by an engine control unit or by limiting the extent to which a throttle pedal can be depressed, preventing any re-acceleration.

All these measures can be implemented by an engine control unit ECU, advantageously at the request of the motor vehicle control unit VCU.

These temporary malfunctionings of the motor vehicle may be respectively linked to a type of breakdown, being representative of this type of breakdown. This may allow the driver to recognise the breakdown and also, where appropriate, to be fooled by the temporary malfunctionings that the driver may liken to early signs of the imminent breakdown.

For example, a stopping of the engine or a complete cutting-off of injection may be linked with an imminent out-of-fuel breakdown. A limiting of engine speed or a reduction of injection may correspond to an imminent breakdown caused by a failure of the injection system.

Likewise, cutting-off the demand for torque from an electric motor may correspond to an imminent breakdown of a traction battery of an electric motor vehicle.

FIG. 1 shows one example of a flowchart with exchanges between a motor vehicle control unit VCU and an engine control unit ECU for implementing the above-described method according to the present invention.

Starting from a nominal status referenced 1, which is the initial status after the ECU units have been switched on, for example after the opening of the doors or the insertion of the ignition key, for each of the two units VCU, ECU, a breakdown-imminent decisions step 2 is performed in each of the units. If the response is no N, the method returns to the nominal status 1 and if the response is yes O, the engine control unit ECU maintains the nominal mode with a step of transmitting to the motor vehicle control unit VCU the information regarding an imminent breakdown, this being referenced 3 in FIG. 1.

The arrow between the two units ECU, VCU illustrates the transmission of information from the engine control unit ECU to the motor vehicle control unit VCU. A similar but symmetrical situation is indicated by an arrow pointing in the opposite direction between the two units VCU, ECU.

Having received this information, for the motor vehicle control unit VCU, if the response is no N, the method returns to the nominal status 1 and if the response is yes O, the motor vehicle control unit VCU performs a step of determining when and where the motor vehicle needs to stop, this being referenced 4 in FIG. 1.

A decision step is then performed in the motor vehicle control unit VCU in order to determine whether the vehicle is driving near a safe stopping place, which is to say is shortly going to pass a safe stopping place, this being referenced 5 in FIG. 1.

If the response is no N, the method returns to before the decision step 4 of deciding when and where the motor vehicle is to stop. If the response is yes O, the motor vehicle control unit VCU performs a step of transmitting the information to the engine control unit ECU, this being referenced 6 in FIG. 1.

In the engine control unit ECU, having received the information sent by the vehicle control unit VCU, a decision step is performed to determine whether the information regarding the proximity of a safe stopping place on the route followed by the vehicle coming from the motor vehicle control unit VCU has actually been received, this being referenced 7 in FIG. 1.

If the response is no N, the method returns to before step 3 of transmitting the information to the motor vehicle control unit VCU. If the response is yes O, the engine control unit ECU performs a step of implementing at least one temporary malfunctioning, this being referenced 8 in FIG. 1, to encourage the driver to stop at the safe stopping place near the vehicle.

Returning now to the motor vehicle control unit VCU, a decision step is performed to determine whether the vehicle has left and gone past the safe stopping place, this being referenced 9 in FIG. 1.

If the response is no N, then the instruction to stop continues to be sent to the ECU. If the response is yes O, the method moves on to step 10. In step 10, in the motor vehicle control unit VCU, the method returns to before the step 4 of determining when and where the motor vehicle needs to stop, and a step of transmitting this information to the engine control unit ECU is performed In the engine control unit ECU, following receipt of this information, a decision step is performed to determine whether this information relating to the vehicle having left the safe stopping place coming from the motor vehicle control unit VCU has actually been received, this being referenced 11 in FIG. 1.

If the response is no N, the method returns to before the step of implementing at least one temporary malfunctioning, this being referenced 8 in FIG. 1. The application of temporary malfunctionings may thus continue.

If the response is yes O, the method returns to before the step 3 of transmitting the imminent-breakdown information to the motor vehicle control unit VCU, and is therefore in a position to inform the motor vehicle control unit VCU to look for a new safe stopping zone.

Figure 2:
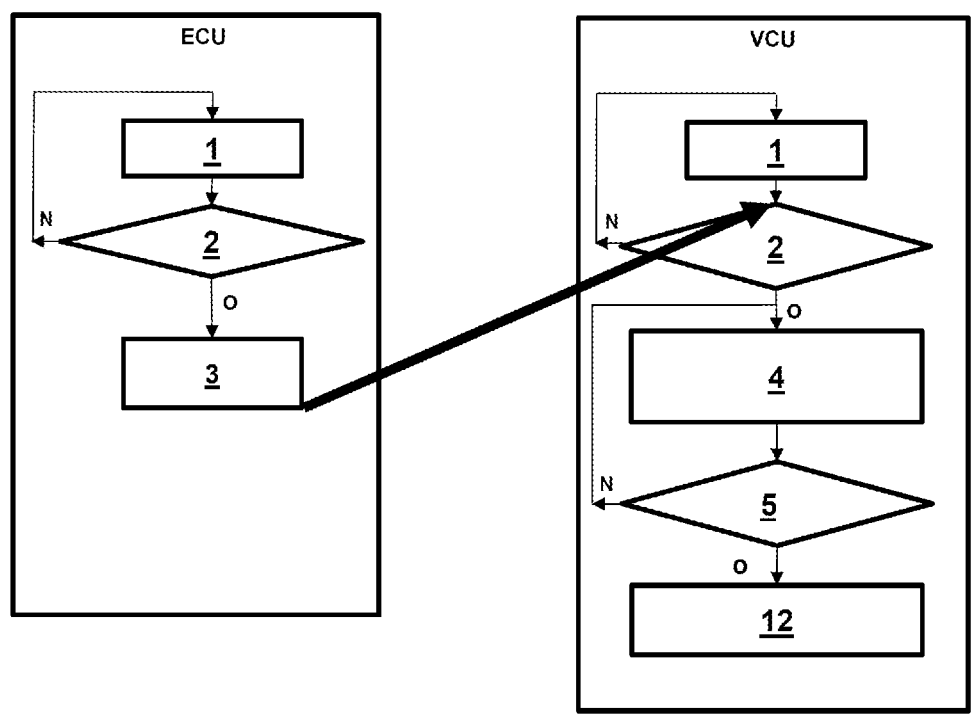
FIG. 2 is a schematic representation of a method for locating a stopping place for a motor vehicle with breakdown imminent, according to the prior art.

Compare this with FIG. 2 which shows a flowchart according to the prior art and corresponds to document U.S. Pat. No. 9,014,960 B2. Some of the steps shown in this FIG. 2 have already been illustrated in FIG. 1.

FIG. 2 shows a flowchart with exchanges between a motor vehicle control unit VCU and an engine control unit ECU for implementing a method according to the closest prior art.

Starting from a nominal status referenced 1 for both units, a decision step 2 regarding an imminent breakdown is performed in each of the units ECU, VCU. If the response is no N, the method returns to the nominal status 1 and if the response is yes O, the engine control unit ECU maintains the nominal mode with a step of transmitting to the motor vehicle control unit VCU the information regarding an imminent breakdown, this being referenced 3 in FIG. 2.

As far as the engine control unit ECU is concerned, the succession of steps ends there. There is no step of implementing at least one temporary malfunctioning, previously referenced 8 in FIG. 1, unlike in the method according to the present invention.

The arrow between the transmission step 3 in the engine control unit ECU and the imminent-breakdown decision step 2 in the vehicle control unit VCU illustrates a transmission of information from the engine control unit ECU to the motor vehicle control unit VCU.

For the motor vehicle control unit VCU, if the response is no N, the method returns to the nominal status 1 and if the response is yes O, the motor vehicle control unit VCU performs a step of determining when and where the motor vehicle needs to stop, this being referenced 4 in FIG. 2.

A decision step is then performed in the motor vehicle control unit VCU in order to determine whether the vehicle is near a safe stopping place, this being referenced 5 in FIG. 2.

If the response is no N, the method returns to before the decision step 4 of deciding when and where the motor vehicle is to stop. If the response is yes O, the motor vehicle control unit VCU performs a step 12 of informing the driver of this proximity of the stop, which is a step that of course differs from the step of transmitting information to the engine control unit ECU if the vehicle is near a safe place, which was referenced 6 in FIG. 1, so that it can implement one or more temporary malfunctionings in the step referenced 8 in FIG. 1.

It can be seen that the prior art did not undertake any step of implementing at least one temporary malfunctioning, previously referenced 8 in FIG. 1, which is an essential feature of the present invention.

In the context of the invention, the method may comprise a step of visually or audibly warning the driver that an imminent breakdown has been detected, including a mention of the type of imminent breakdown detected, but this is merely optional.

The invention therefore relates to a motor vehicle comprising an engine control unit ECU and a vehicle control unit VCU, the vehicle implementing such a method for requesting a stop, which request is formulated and issued automatically by the motor vehicle.

The engine control unit ECU comprises means for detecting the imminence of a breakdown with the engine or with an element associated with the engine, and the vehicle control unit VCU comprises means for detecting the imminence of a breakdown other than a breakdown with the engine or with an element associated with the engine.

Specifically, within the context of the present invention, the breakdown may be other than an engine breakdown and the monitoring of imminent breakdowns not originating from the engine may also be performed by the motor vehicle control unit VCU.

The motor vehicle control unit VCU also comprises means for geo-locating both the vehicle and the closest structure for repairing an imminent breakdown, means for formulating a route that the vehicle needs to follow in order to reach the structure and for locating at least one safe stopping place that is en-route.

The two units ECU, VCU comprise means for receiving and transmitting information between them, the engine control unit ECU informing the vehicle control unit VCU of an imminent breakdown with the engine or with an element associated with the engine, and the vehicle control unit VCU sending the engine control unit ECU a request for temporary malfunctioning of the motor vehicle just before the motor vehicle passes said at least one safe stopping place or the structure when the imminence of a breakdown has been detected by one of the two units ECU, VCU.

Finally, the vehicle control unit VCU comprises means for terminating the implementation of the method when the vehicle has been stopped at said at least one safe stopping place or at the structure and sends the engine control unit ECU a request to end the temporary malfunctioning.

The invention claimed is:

1. A method for requesting stopping of a motor vehicle by formulating and automatically issuing a request by the motor vehicle, the method comprising:
    a step of detecting at least one imminent breakdown of the motor vehicle;
    a step of geo-locating a closest structure to repair said at least one breakdown;
    a step of indicating to a driver of the motor vehicle the route to be followed in order to reach the structure after having geo-located a position of the motor vehicle and at least one safe stopping place that is on the route of the motor vehicle toward the structure; and
    a step of automatically causing the motor vehicle to temporarily malfunction just before the motor vehicle passes said at least one safe stopping place or passes the structure, to encourage the driver to stop at said at least one safe stopping place or at the structure.

2. The method as claimed in claim 1, further comprising evaluating that the imminence of the breakdown is predictable and quantifiable in terms of one or more of a time duration and a number of kilometers that are able to be covered until the breakdown occurs, and
    wherein the motor vehicle is not caused to temporarily malfunction just before the vehicle passes said at least one safe stopping place when one or more of the time and the number of kilometers before the breakdown occurs allows the motor vehicle to reach the structure without stopping.

3. The method as claimed in claim 2, further comprising categorizing a set of breakdowns the imminence of which is unpredictable and unquantifiable; and
    determining a level of severity for each of the set of breakdowns, a temporary malfunction associated with one of the set of breakdowns having a higher level of severity than another one of the set of breakdowns having one or more of a longer duration and a higher amplitude of malfunctioning than the one breakdown.

4. The method as claimed in claim 3, wherein the temporary malfunction of the motor vehicle is a temporary cutting-out of the engine of the motor vehicle just before the vehicle passes the structure and when one of: (i) the determined level of severity of the breakdown is at a maximum for the set of breakdowns the imminence of which is unpredictable and unquantifiable, and (ii) no other structure is geo-located as being reachable within one or more of the time and the number of kilometers that are able to be covered before the breakdown occurs in the case of a breakdown imminence that is predictable and can be quantified in terms of one or more of the time and the number of kilometers that are able to be covered.

5. The method as claimed in claim 1, wherein temporary malfunctionings of the motor vehicle just before the motor vehicle passes one of the safe stopping places increase in one or more of a duration and an amplitude of the malfunction affecting the vehicle the farther the motor vehicle progresses along the route, when a plurality of safe stopping places are geo-located on the route of the motor vehicle toward the structure.

6. The method as claimed in claim 1, wherein at least one temporarily malfunction of the motor vehicle is an intermittent cutting-out of the engine of the vehicle, followed by a normal engine operation, a complete cutting-off or temporary reduction in the injection of fuel into a combustion engine of the motor vehicle being powered by a combustion engine, a cutting-off of a demand for torque from an electric motor of the motor vehicle that is powered electrically, so that the motor vehicle advances only by coasting in an engine-powered mode or in an electrically-powered mode respectively, a limiting of engine speed by an engine control unit (ECU) or by limiting the extent to which a throttle pedal is able to be depressed, preventing any re-acceleration.

7. The method as claimed in claim 6, wherein the at least one temporary malfunction of the motor vehicle is respectively linked to a type of the breakdown, the type of the breakdown being one of an imminent out-of-fuel breakdown, an imminent breakdown caused by failure of the injection system, and an imminent breakdown with a traction battery of the motor vehicle that is electric, and
    wherein a stopping of the engine or a complete cutting-off of the injection is linked with the imminent out-of-fuel breakdown,
    a limiting of the engine speed or a reduction in injection corresponds to the imminent breakdown caused by failure of the injection system, and
    the cutting-off of the demand for torque corresponds to the imminent breakdown with the traction battery of the motor vehicle that is electric.

8. The method as claimed in claim 1, wherein the temporary malfunctioning of the motor vehicle occurs an estimated duration of more than ten seconds before the motor vehicle passes the at least one safe stopping place or the structure, depending on the current speed so that the motor vehicle reaches said at least one safe stopping place or the structure.

9. The method as claimed in claim 1, further comprising visually or audibly warning the driver that the imminent breakdown is detected, including a mention of the type of imminent breakdown detected.

10. A motor vehicle comprising:
an engine control unit (ECU); and
a vehicle control unit (VCU),
the vehicle implementing the method for requesting a stop, which request is formulated and emitted automatically by the motor vehicle as claimed in claim 1,
wherein the engine control unit (ECU) comprises a first detector configured to detect the imminence of the breakdown with the engine or with an element associated with the engine, and
the vehicle control unit (VCU) comprises
a second detector configured to detect the imminence of another breakdown other than the breakdown with the engine or with the element associated with the engine,
one or more processors configured to geo-locate both the vehicle and the closest structure to repair the imminent breakdown, formulate a route that the vehicle needs to follow in order to reach the structure and to locate the at least one safe stopping place that is en-route, the two units comprising a transmitter/receiver configured to transmit and receive information between the ECU and the VCU, the engine control unit (ECU) informing the vehicle control unit (VCU) of the imminent breakdown with the engine or with the element associated with the engine, and the vehicle control unit (VCU) sending the engine control unit (ECU) a request to cause temporary malfunctioning of the motor vehicle just before the motor vehicle passes said at least one safe stopping place or the structure when the imminence of a breakdown has been detected by one of the two units, the vehicle control unit (VCU) being configured to terminate implementation of the method when the vehicle has been stopped at said at least one safe stopping place or at the structure and sending the engine control unit (ECU) a request to end the temporary malfunctioning.

11. The method as claimed in claim 1, further comprising categorizing a set of breakdowns the imminence of which is unpredictable and unquantifiable; and
determining a level of severity for each of the set of breakdowns, a temporary malfunction associated with one of the set of breakdowns having a higher level of severity than another one of the set of breakdowns having one or more of a longer duration and a higher amplitude of malfunctioning than the one breakdown.

12. The method as claimed in claim 2, wherein temporary malfunctionings of the motor vehicle just before the motor vehicle passes one of the safe stopping places increase in one or more of a duration and an amplitude of the malfunction affecting the vehicle the farther the motor vehicle progresses along the route, when a plurality of safe stopping places are geo-located on the route of the motor vehicle toward the structure.

13. The method as claimed in claim 3, wherein temporary malfunctionings of the motor vehicle just before the motor vehicle passes one of the safe stopping places increase in one or more of a duration and an amplitude of the malfunction affecting the vehicle the farther the motor vehicle progresses along the route, when a plurality of safe stopping places are geo-located on the route of the motor vehicle toward the structure.

14. The method as claimed in claim 4, wherein temporary malfunctionings of the motor vehicle just before the motor vehicle passes one of the safe stopping places increase in one or more of a duration and an amplitude of the malfunction affecting the vehicle the farther the motor vehicle progresses along the route, when a plurality of safe stopping places are geo-located on the route of the motor vehicle toward the structure.

15. The method as claimed in claim 2, wherein at least one temporarily malfunction of the motor vehicle is an intermittent cutting-out of the engine of the vehicle, followed by a normal engine operation, a complete cutting-off or temporary reduction in the injection of fuel into a combustion engine of the motor vehicle being powered by a combustion engine, a cutting-off of a demand for torque from an electric motor of the motor vehicle that is powered electrically, so that the motor vehicle advances only by coasting in an engine-powered mode or in an electrically-powered mode respectively, a limiting of engine speed by an engine control unit (ECU) or by limiting the extent to which a throttle pedal is able to be depressed, preventing any re-acceleration.

16. The method as claimed in claim 3, wherein at least one temporarily malfunction of the motor vehicle is an intermittent cutting-out of the engine of the vehicle, followed by a normal engine operation, a complete cutting-off or temporary reduction in the injection of fuel into a combustion engine of the motor vehicle being powered by a combustion engine, a cutting-off of a demand for torque from an electric motor of the motor vehicle that is powered electrically, so that the motor vehicle advances only by coasting in an engine-powered mode or in an electrically-powered mode respectively, a limiting of engine speed by an engine control unit (ECU) or by limiting the extent to which a throttle pedal is able to be depressed, preventing any re-acceleration.

17. The method as claimed in claim 4, wherein at least one temporarily malfunction of the motor vehicle is an intermittent cutting-out of the engine of the vehicle, followed by a normal engine operation, a complete cutting-off or temporary reduction in the injection of fuel into a combustion engine of the motor vehicle being powered by a combustion engine, a cutting-off of a demand for torque from an electric motor of the motor vehicle that is powered electrically, so that the motor vehicle advances only by coasting in an engine-powered mode or in an electrically-powered mode respectively, a limiting of engine speed by an engine control unit (ECU) or by limiting the extent to which a throttle pedal is able to be depressed, preventing any re-acceleration.

18. The method as claimed in claim 5, wherein the temporarily malfunctionings of the motor vehicle are an intermittent cutting-out of the engine of the vehicle, followed by a normal engine operation, a complete cutting-off or temporary reduction in the injection of fuel into a combustion engine of the motor vehicle being powered by a combustion engine, a cutting-off of a demand for torque from an electric motor of the motor vehicle that is powered electrically, so that the motor vehicle advances only by coasting in an engine-powered mode or in an electrically-powered mode respectively, a limiting of engine speed by an engine control unit (ECU) or by limiting the extent to which a throttle pedal is able to be depressed, preventing any re-acceleration.

19. The method as claimed in claim 2, wherein the temporary malfunctioning of the motor vehicle occurs an estimated duration of more than ten seconds before the motor vehicle passes the at least one safe stopping place or the structure, depending on the current speed so that the motor vehicle reaches said at least one safe stopping place or the structure.

20. The method as claimed in claim 3, wherein the temporary malfunctioning of the motor vehicle occurs an estimated duration of more than ten seconds before the motor vehicle passes the at least one safe stopping place or the structure, depending on the current speed so that the motor vehicle reaches said at least one safe stopping place or the structure.

* * * * *